Jan. 1, 1924

B. E. FERNOW, JR

POWER TRANSMISSION MECHANISM

Filed Dec. 16, 1918

1,479,034

Inventor
Bernhard E. Fernow Jr.
By Frank O. Hubbard
Attorney

Patented Jan. 1, 1924.

1,479,034

UNITED STATES PATENT OFFICE.

BERNHARD E. FERNOW, JR., OF MILWAUKEE, WISCONSIN, ASSIGNOR TO THE CUTLER-HAMMER MFG. CO., OF MILWAUKEE, WISCONSIN, A CORPORATION OF WISCONSIN.

POWER-TRANSMISSION MECHANISM.

Application filed December 16, 1918. Serial No. 266,926.

*To all whom it may concern:*

Be it known that I, BERNHARD E. FERNOW, Jr., a citizen of the United States, residing at Milwaukee, in the county of Milwaukee and State of Wisconsin, have invented new and useful Improvements in Power-Transmission Mechanisms, of which the following is a full, clear, concise, and exact description, reference being had to the accompanying drawing, forming a part of this specification.

This invention relates to power transmission mechanisms.

In certain classes of industrial installations of which rubber rolling mills may be taken as exemplary, it has heretofore been found necessary to employ both a releasable clutch and a flexible coupling in the power connection, and the present invention has among its objects to provide for the aforesaid and analogous installations a simplified and more compact transmission mechanism embodying the combined operative characteristics of said elements.

A further object of the invention is that of providing a transmission mechanism of the character aforestated adapted to be readily installed between permanently mounted driving and driven devices and readily removable therefrom.

A still further object is that of providing a transmission mechanism of the character stated wherein the various parts are co-ordinated for support thereof by permanently mounted driving and driven members.

Other objects and advantages will hereinafter appear.

Figure 1:
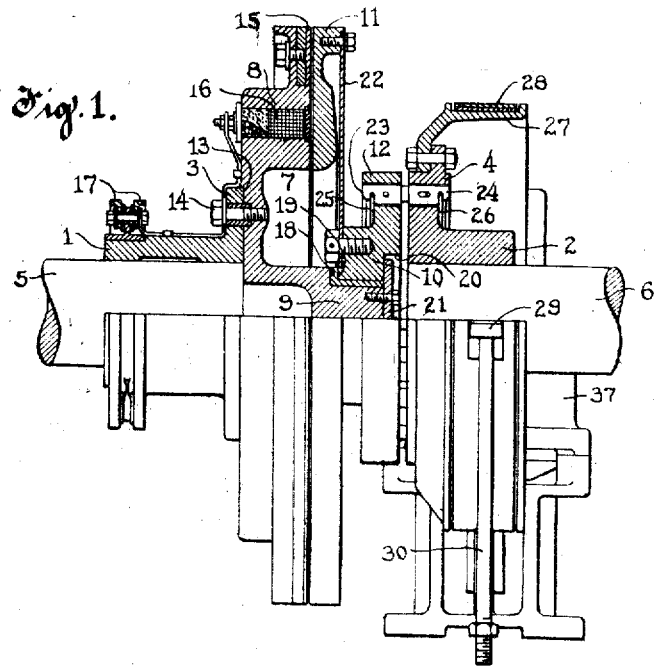
Figure 2:
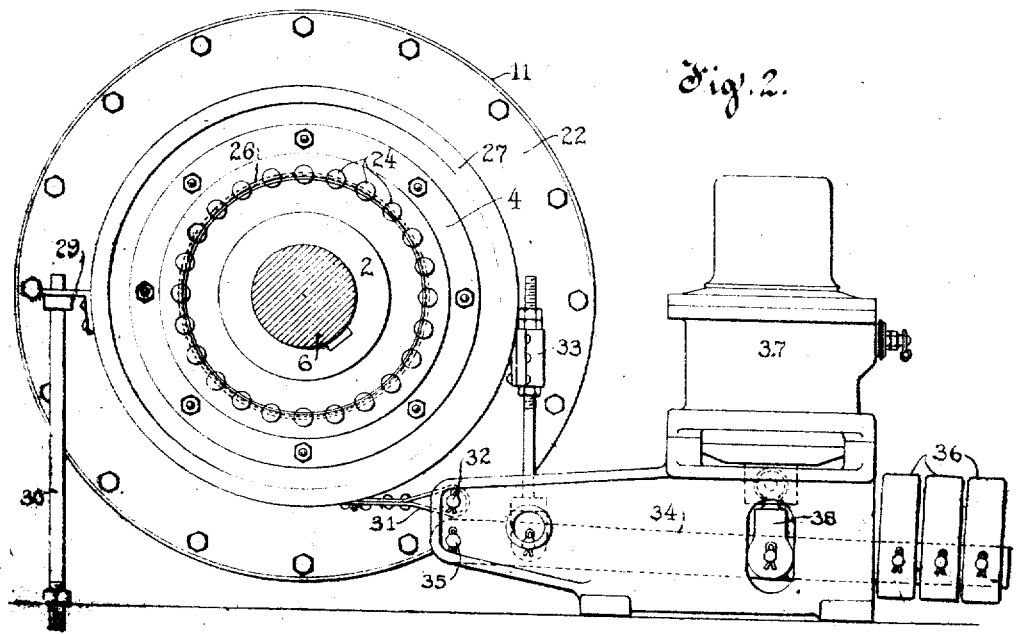

In the accompanying drawing, wherein is illustrated an embodiment of the invention, Figure 1 is a side elevational view, partly in section, thereof, while, Fig. 2 is an end elevational view of the same.

Referring to the drawing, the same illustrates a pair of hubs 1 and 2 having flanges 3 and 4 respectively and being adapted for fixed mounting respectively upon a driving shaft 5 and a driven shaft 6 with their flanges opposed to each other and arranged flush with the ends of said shafts. The latter are substantially aligned and separated axially to provide a space between said flanges for ready insertion or removal in assembled relation of an electromagnetic clutch mechanism indicated generally at 7 having its field member 8 centrally extended in an axial direction to provide a supporting bearing 9 for an additional flanged hub member 10, the latter constituting a support for the clutch armature 11 and furthermore having its flange 12 arranged adjacent the corresponding flange 4 of the hub member 2 for flexible and releasable connection therewith.

More particularly, the field member 8 is provided with a shallow counterbored portion 13 to receive the end of the flange 3 for support of the former, said field member and said flange being provided with a series of registering openings to receive bolts 14 for rigidly securing said members together, said field member being provided with the usual friction ring 15 and with a channel to receive an electromagnetic winding 16, the latter being supplied with current in the usual manner from a suitable source through slip rings indicated at 17.

The axially extended central portion of said field member is provided with an annular shoulder 18 against which a shoulder 19 of the hub 10 is adapted to abut, suitable anti-friction packing being interposed. The flanged end of said hub 10 is furthermore counterbored as indicated at 20 to provide an additional shoulder adapted to lie flush with the adjacent end of said central section of the clutch field member, a disk 21 being secured to the latter by means of lag bolts for securing said hub against axial movement relative to said field member, while permitting relative rotation thereof, the counterbored portion of said hub being preferably of sufficient depth to receive the heads of the lag bolts within the axial projection thereof.

The clutch armature 11 is preferably secured in the usual manner to an annular spring disk 22, the latter being centrally fixed, by lag bolts or other means, to the side of the hub member 10 adjacent the clutch field member whereby said armature and spring disk are supported for rotation independent of the field member and are held against axial movement relative thereto excepting the spring biased movement of the armature 11 common to clutches of this character.

The flexible connection between the flanges of the hub members 2 and 10, which is of known construction, comprises essentially a plurality of flexible units to be secured in registering recesses of said flanges, each unit including a group of leaf springs arranged flatwise and having caps 23 and 24 fitted over their ends. Each cap is furthermore secured in place by a pin passing therethrough and through the portions of the leaf springs enclosed thereby, whereas the pin openings in one of said caps are extended axially to provide slots for permitting a limited relative axial movement between said cap and its enclosed springs. The aforedescribed spring units are insertable from either side within the registering openings in the flanges 4 and 12, the respective caps being provided with channels to receive resilient wire rings 25 and 26 which are sprung into the aforesaid channels after assembling of the spring units within the flanges, each ring being adapted to rest against the outer axial face of its adjacent flange for retaining the caps engaged thereby against axial movement.

The aforedescribed lost motion connection between the units and their respective caps in conjunction with the flexibility of each unit permits the bearing to adjust itself to moderate degrees of misalignment or eccentricity of the driving and driven shafts whether such conditions be permanent, temporary or recurrent.

From the foregoing it is obvious that upon removal of the spring rings 25 and 26, the flexible units may be removed axially and that thereafter upon removal of lag bolts 14, the assembled clutch and coupling elements may be shifted slightly to the right of the drawing for freeing the flange 3 from the counter bored portion 13 and that thereafter said elements may be removed as a unit from between the driving and driven supports whereas for reassembly only similar steps in opposite sequence are required. Also, the aforedescribed combination wherein the constitutent elements of the unit are arranged to support one another obviates the necessity of the connecting shaft and bearings customarily employed.

A brake drum 27 is mounted upon the outer periphery of the flange 4 of the driven hub or coupling element 2 being secured thereto by bolts passing through registering lugs of said drum and element, whereby said drum may also be readily removed without displacement of the driving and driven members, after removal of the transmission mechanism.

Said drum is encircled by a brake band 28, the latter being anchored to a fixed portion of the machine frame by means of a bracket 29 secured to said band and a bolt 30 for rigidly securing said bracket to the frame. One end of said band is furthermore provided with a loop 31 to surround a fixed bolt 32 while the other end of said band is attached by means of an adjustable connection 33 to an oscillatable lever 34 having one end fulcrumed at 35 and the other end provided with adjustable weights 36 normally tending to tighten the band about the drum. For releasing the brake, the lever 34 is provided with a releasing solenoid, indicated generally at 37, the plunger of said solenoid being connected by a link 38 to said lever at a point intermediate the fulcrum 35 and the weights 36. The operation of the brake is believed to be obvious from the foregoing description, it being understood that the clutch and solenoid windings may be interconnected to provide for release of the brake upon engagement of the clutch and vice versa.

What I claim as new and desire to secure by Letters Patent is:

1. The combination with substantially aligned flanged driving and driven members arranged with their flanges adjacent one another and relatively spaced, of a power transmission mechanism insertable between said flanges and removable therefrom without displacement thereof, said mechanism including axially aligned members to be secured to said flanges respectively for support solely thereby and being adapted to provide a flexible and a releasable power connection therebetween.

2. The combination with a pair of flanged hubs to be mounted respectively upon substantially aligned driving and driven shafts, of transmission means adapted to be inserted as a unit between said hubs to provide a power connection therefor, said mechanism including a magnetic clutch field member to be secured to one of said hubs and having an axially projecting portion, an additional flanged member revolubly supported upon said projecting portion in register with the other of said hubs for flexible connection therewith and a clutch armature carried by said flanged member for co-operation with said field member.

3. The combination with substantially axially aligned flanged driving and driven members arranged with their flanges adjacent one another and relatively spaced, of a power transmission mechanism insertable between said flanges and removable therefrom without displacement thereof, said mechanism including a member to be rigidly secured to one of said flanges, an axially aligned and relatively rotatable member supported thereby for flexible connection with the other of said flanges and intermediate mechanism providing a releasable power connection between said latter members.

4. The combination with a pair of substantially axially aligned flanged driving and driven members arranged with their flanges adjacent one another and relatively spaced, of a power transmission mechanism both insertable between said flanges and removable therefrom without displacement thereof, said mechanism including an electromagnetic field member to be rigidly secured to one of said flanged members in axial alignment therewith, an aligned relatively rotatable member carried by said field member and held against movement axially thereof, a clutch armature carried by said rotatable member for co-operation with said field member to provide a releasable power connection for said members, and means for positively and releasably securing said rotatable member to the other of said hub members.

5. The combination with substantially axially aligned driving and driven members, of a transmission unit adapted to provide a releasable and flexible power connection therebetween, said unit including a clutch field member to be rigidly secured to one of said driving and driven members and having an axially aligned portion projecting toward the other of said members and a coupling element rotatably mounted on said projecting portion of said field member for flexible connection with said latter of said driving and driven members and a clutch armature positively but resiliently secured to said coupling element for support thereby in co-operative relation to said field member.

6. A power transmission mechanism comprising end elements to be secured to driving and driven members and intermediate elements to be supported by and between said end elements and removable therefrom in assembled relation without displacement of said latter elements, said intermediate elements including a clutch field member to be rigidly secured to one end element and a co-operating armature carried thereby substantially in alignment therewith and having a flexible connection with the other end element.

7. A power transmission mechanism comprising end elements to be secured to driving and driven members respectively and intermediate elements to be supported by and between said end elements and removable therefrom in assembled relation without displacement of said latter elements, said intermediate elements including a clutch field member to be rigidly secured to one end element and having an axially aligned portion projecting toward the other end element, a relatively rotatable member mounted upon said projecting portion of said field member and having a flexible connection with said latter end element and a clutch armature carried by said relatively rotatable member for co-operation with said field member.

8. A power transmission mechanism comprising end elements to be secured to driving and driven members respectively and intermediate elements to be supported by and between said end elements and removable therefrom in assembled relation without displacement of said latter elements, said intermediate elements including a clutch field member to be rigidly secured to one end element and having an axially aligned portion projecting toward the other end element, a relatively rotatable member mounted upon said projecting portion of said field member, a clutch armature carried by said relatively rotatable member for co-operation with said field member, and a flexible connection between said relatively rotatable member and said latter end element including flexible units to be inserted within registering openings of said member and said element and joint releasable retaining means for said units.

9. The combination with flanged and substantially axially aligned driving and driven members, of a power transmission mechanism including an electro-magnetic clutch providing a releasable and flexible driving connection between said members, said mechanism comprising elements co-ordinated for support of said mechanism solely by the flanges of said members and a brake including a brake wheel carried by one of said members.

10. The combination with substantially axially aligned driving and driven members having substantially flush flanges opposing one another, of a brake including a brake wheel secured to one of said flanges, a power transmission mechanism for said members including an electromagnetic clutch and a flexible connection co-ordinated for support thereof solely by and between the flanges of said members and for removability without displacement of said members.

11. The combination with axially spaced flanged driving and driven members, of transmission mechanism including an electro-magnetic clutch, supported solely by said members to provide a releasable and flexible power connection therebetween and a brake wheel carried by one of said members, said transmission mechanism and said brake wheel each having less axial dimension than the space between said members whereby said transmission mechanism and said brake wheel may be removed and replaced as individual units without relative displacement of said members.

12. The combination with spaced and substantially axially aligned driving and driven members, of an electro-magnetic clutch supported solely by and between said members, and a brake including an integral brake wheel supported by said driven member, said clutch and brake wheel each having less axial dimensions than the space between said members whereby said clutch and said brake wheel are removable without relative displacement of said driving and driven members.

13. The combination with substantially axially aligned flanged driving and driven members arranged with their flanges adjacent one another and relatively spaced, of a power transmission mechanism of less axial dimension than the space between the flanges and insertable between said flanges and removable therefrom without displacement of said members, said mechanism including an electromagnetic clutch member to be rigidly secured to one of said flanges, an axially aligned and relatively rotatable member supported thereby for connection with the other of said flanges and another clutch member arranged intermediate said former members to provide therewith a releasable power connection between said driving and driven members.

In witness whereof, I have hereunto subscribed my name.

BERNHARD E. FERNOW, Jr.